W. Bramwell,
Stop Cock,
No. 24,369. Patented June 14, 1859.
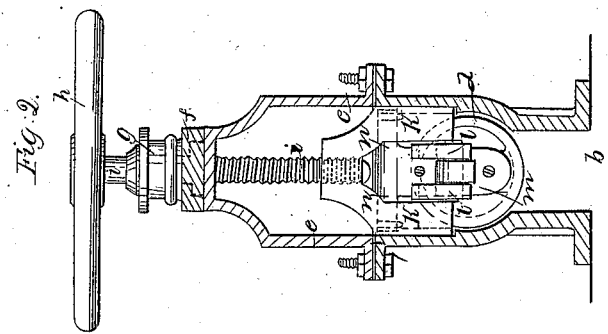
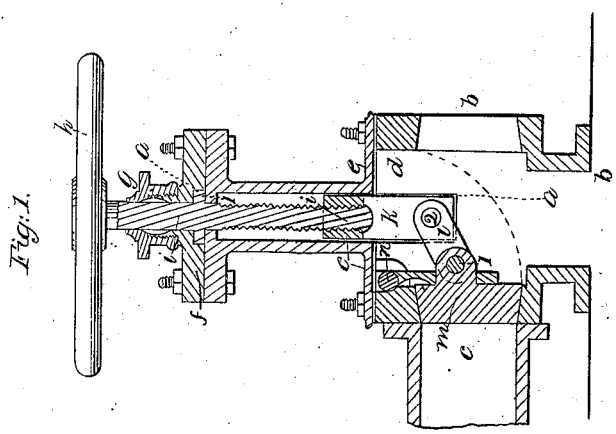
Witnesses:
Lemuel W. Serrell
Chas. H. Smith
Inventor:
Wm. Bramwell

UNITED STATES PATENT OFFICE.

WM. BRAMWELL, OF NEW YORK, N. Y.

VALVE.

Specification of Letters Patent No. 24,369, dated June 14, 1859.

*To all whom it may concern:*

Be it known that I, WILLIAM BRAMWELL, of the city, county, and State of New York, have invented, made, and applied to use a certain new and useful Improvement in Stop-Valves, which I term the "Combined Screw and Toggle-Link Stop-Valve;" and I do hereby declare that the following is a full, clear, and exact description of the construction and operation of the same, reference being had to the annexed drawings, making part of this specification, wherein—

Figure 1 is a vertical section of said valve and Fig. 2 is a vertical section at the line $a, a,$ of Fig. 1.

Similar marks of reference denote like parts.

The nature of my said invention consists in combining with a swinging valve, a screw slide and connecting link whereby the said valve can be turned up entirely out of the way of the passing current of fluid or liquid, or pressed down onto its seat with the combined power of a toggle joint and screw. My valve is very simple and easily constructed durable and efficient in use and applicable to steam, water or other fluids or liquids.

In the drawing $b, b,$ represent the openings to which one or more pipes are connected in any usual manner, and $c,$ is the pipe to which the ingress or egress is opened by the valve $m,$ or closed by said valve when in the position shown in the drawings. The valve $m,$ is attached by the hinge pin $n,$ and swings in the chamber $d,$ of the valve.

$e,$ is the cover or cap screwed onto the upper part of said chamber $d,$ and $f$ is the top plate of the cap $e,$ formed with a stuffing box $g$ through which the screw spindle $i$ passes. This spindle $i,$ is provided with a crank or hand wheel $h,$ and also a circular collar $l,$ that prevents said spindle moving endwise but allows of its rotation by the said hand wheel $h.$ $k$ is a sliding nut moving in a chamber in the cover $e,$ and $l, l,$ are toggle links connecting said nut to the valve $m.$ It will now be apparent that by revolving the screw spindle $i,$ the nut $k,$ will be drawn up and by the links $l, l,$ will turn the valve $m,$ up and open the passageway entirely through the seat of said valve; or by turning said screw spindle $i,$ the other way the valve $m,$ will be shut down into its seat, and forced very tightly against the same by the screw and toggle motion of the links $l, l.$ By removing the cap $e, e,$ the whole of the parts can be lifted out and the valve cleaned or freed from obstruction, or ground into its seat, without disturbing the pipes or connections, whereas in most other valves the same have to be removed from the pipes to effect any repairs.

What I claim as my invention and desire to secure by Letters Patent is—

The sliding nut $k,$ actuated by the screw $i,$ in combination with the hinged valve $m,$ and toggle links $l, l,$ substantially as specified.

In witness whereof I have hereunto set my signature this fifteenth day of April 1859.

WM. BRAMWELL.

Witnesses:
LEMUEL W. SERRELL,
CHAS. H. SMITH.